(12) United States Patent
Duane

(10) Patent No.: US 8,560,837 B1
(45) Date of Patent: Oct. 15, 2013

(54) AUTOMATICALLY ESTIMATING CLOCK OFFSET

(75) Inventor: William M. Duane, Westford, MA (US)

(73) Assignee: EMC Corporation, Hopkinton, MA (US)

( * ) Notice: Subject to any disclaimer, the term of this patent is extended or adjusted under 35 U.S.C. 154(b) by 528 days.

(21) Appl. No.: 12/826,935

(22) Filed: Jun. 30, 2010

(51) Int. Cl.
*H04L 29/06* (2006.01)
*G06F 17/30* (2006.01)
*G06F 7/04* (2006.01)
*G06F 15/16* (2006.01)
*H04L 12/403* (2006.01)
*H04L 12/42* (2006.01)

(52) U.S. Cl.
USPC ............... 713/155; 713/150; 709/217; 726/2; 370/457; 380/28

(58) Field of Classification Search
USPC .......... 726/2–8; 713/168–174, 182–186, 202; 709/229, 225
See application file for complete search history.

(56) References Cited

U.S. PATENT DOCUMENTS

| | | | |
|---|---|---|---|
| 2007/0133591 A1* | 6/2007 | Shatford | 370/457 |
| 2009/0279689 A1* | 11/2009 | Ciet et al. | 380/28 |
| 2009/0300738 A1* | 12/2009 | Dewe et al. | 726/6 |

* cited by examiner

*Primary Examiner* — Evans Desrosiers
(74) *Attorney, Agent, or Firm* — Krishnendu Gupta; Joseph D'Angelo (57) ABSTRACT

A method, system, and program product for use in estimating clock offset in a security environment, the security environment comprising a token generator comprising a token generator clock and an Authenticator comprising an Authenticator clock, the method comprising recording a plurality of delta values; wherein each value of the plurality of delta values corresponds to a difference between the token generator clock and the Authenticator clock, wherein the token generator clock and the Authenticator clock are not communicatively coupled, and fitting the plurality of delta values to a function.

21 Claims, 8 Drawing Sheets

AUTOMATICALLY ESTIMATING CLOCK OFFSET

BACKGROUND OF THE INVENTION

Computer networks, and in particular Wide Area Networks (WANs) such as the Internet, provide opportunities for the misuse and abuse of communications traveling thereover. For example, two users (e.g., a human user and an enterprise server) communicating via the WAN may have their communications intercepted and/or altered. Also, it is possible for one user to misrepresent his, her, or its identity to another user.

Thus, there is a need for both privacy and authentication between users of the network communicating with one another. In other words, users should be able to rely on the fact that their transmissions will not be intercepted or altered, and that transmissions from someone purporting to be a particular user do in fact originate from that user.

In many secure communication applications, a seed is required in order to perform certain cryptographic operations such as encryption, decryption, authentication, etc. The seed may comprise, by way of example, a symmetric key or other secret shared by two or more entities.

One such application is in authentication tokens, such as the RSA SecurID® authentication token commercially available from RSA Security LLC of Bedford, Mass., U.S.A. The RSA SecurID® authentication token is used to provide two-factor authentication. Authorized users are issued individually-registered tokens that generate single-use token codes, which change based on a time code algorithm. For example, a different token code may be generated every 60 seconds. In a given two-factor authentication session, the user is required to enter a personal identification number (PIN) plus the current token code from his or her authentication token. This information is supplied to an authentication entity. The authentication entity may be a server or other processing device equipped with RSA Authentication Manager, available from RSA Security Inc. The PIN and current token code may be transmitted to the authentication entity via an encryption agent equipped with RSA Authenticate Agent software, also available from RSA Security Inc. If the PIN and current token code are determined to be valid, the user is granted access appropriate to his or her authorization level. Thus, the token codes are like temporary passwords that cannot be guessed by an attacker, with other than a negligible probability.

A given RSA SecurID® token typically contains one or more seeds that are utilized in computing the token outputs. The authentication entity performing the verification of the token outputs requires access to one or more seeds associated with the token in question. Typically, such authentication entities have access to the same seed or set of seeds that the token uses to generate its output.

SUMMARY OF THE INVENTION

A method, system, and program product for use in estimating clock offset in a security environment, the security environment comprising a token generator comprising a token generator clock and an Authenticator comprising an Authenticator clock, the method comprising recording a plurality of delta values; wherein each value of the plurality of delta values corresponds to a difference between the token generator clock and the Authenticator clock, wherein the token generator clock and the Authenticator clock are not communicatively coupled, and fitting the plurality of delta values to a function.

DETAILED DESCRIPTION

An authentication token may be used to provide two-factor authentication where a user may be issued an individually-registered token, which generates single-use token codes, which change based on a time code algorithm. For example, a different token code may be generated every 60 seconds. The generation of the token code may be driven by an internal clock of the token generator.

The token code, in isolation or in combination with a user personal identification number (PIN), may be supplied to an authentication entity. Herein, the token code in isolation or in combination with the user PIN may be referred to as a passcode. The authentication entity may be a server or other processing device which may determine if the supplied information is valid, and may grant access appropriate to his or her authorization level. The authentication entity may also have an internal clock to index the supplied token by a given time T. That is, the Authenticator may compare a passcode the token generated to a passcode the Authenticator generates at time T. In doing so, the Authenticator may assume that the time T of the token code is the same as the time T of the Authenticator. In at least some embodiments, the time T may be used as an input to the function to generate the token code. In certain embodiments, if different times are used to generate token codes, the resulting token codes generated may be different. As used herein, a token generator or token may be used interchangeably to refer to what generates a passcode.

In certain embodiments, the internal clocks of the authentication entity and the token generator may be synchronized ("synched") when the token is created. In other embodiments, once synched when the token is created, the token and the Authenticator may not be communicatively coupled to enable further synchronization. The separation of the clocks may present a problem when the clocks are not correctly synched or if the clocks drift apart from being synched. In some embodiments, the drift in clock time may present problems to a user trying to authenticate using the token or token PIN combination, as the token generator may supply a token for time T1, T3, or Tx when the Authenticator, based on its internal clock, compares it to a token at time T2. In at least some embodiments, this may because different times generate different tokens. The clock referred to herein may be any type of device able to estimate the passing of time.

To ameliorate the difference in times, the Authenticator may compare the supplied information to tokens at times T1+1 and T1−1 to determine if there is a match directly outside the time band. However, in cases where the clocks drift further apart, the Authenticator may have to check further and further outside of the current time to authenticate a user.

In an embodiment of the current techniques, the Authenticator may keep track of the differences between the Authenticator's internal clock and the internal clock time of the token generator, based on the supplied token or passcode. By keeping track of the drift between the clocks each time a token is sent, the Authenticator may determine and apply a function to anticipate the internal time of the token to facilitate accounting for clock drift in subsequent authentication requests.

Typically, the drift in clock time may occur for several reasons, some of which may result from the hardware or software used to build the token. In some embodiments, a PC clock used by a software token may drift causing the clocks of the software token and the Authenticator to drift apart. In alternative embodiments, an internal clock of a portable device, such as a cell phone or smart phone may drift, causing a software token's internal clock to differ from an authenticator's internal clock. In further embodiments, a hardware token may also experience clock drift.

Figure 1:
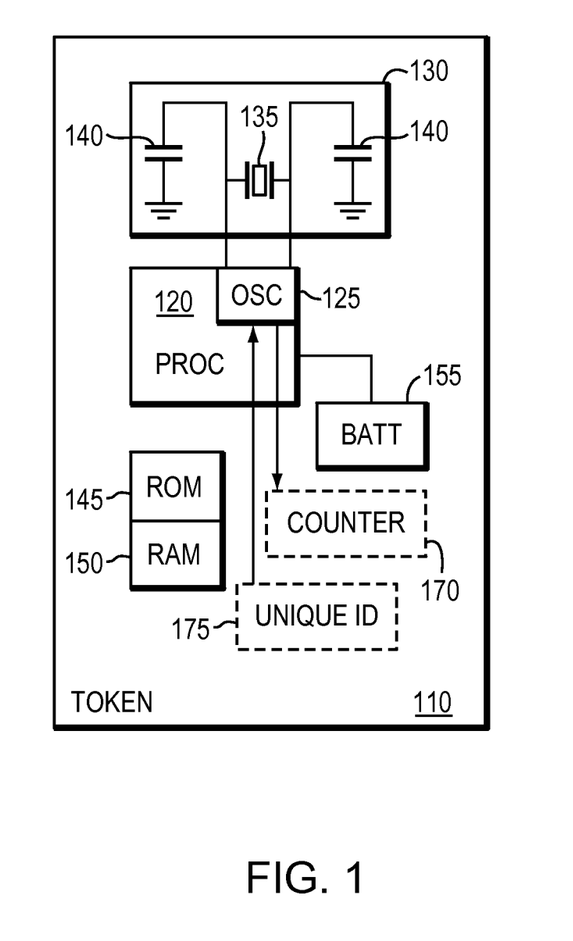
FIG. 1 is a block diagram of an example token generator.

In the example implementation of a token of FIG. 1, token 110 includes a processor 120 having an oscillator section 125 driven by a crystal circuit 130 that includes a crystal 135 and capacitors 140. The processor has or is connected to read only memory (ROM) 145 containing firmware instructions for the processor, and has or is connected to read-write memory (RAM) 150. In the embodiment of FIG. 1, the processor is powered by a battery 155 (in other implementations, power may be supplied in addition or instead by another power source such as a USB port). In other embodiments, other alternative sources of power may be applied to the token.

Depending on the implementation, the token may or may not have a counter 170 and/or a unique identification number such as processor's unique identifier 175. (In another example implementation, e.g., for an event-synchronous token, a simple RC (resistor-capacitor) driven oscillator may be adequate—and in some cases the oscillator is entirely internal to the microprocessor. All such examples still have variations in processor instruction timing due to tolerances.

Conventionally, the processor relies on the oscillator section which runs at a frequency which is determined by a number of electronic component based parameters including the characteristics and tolerances of the oscillator section's crystal, the characteristics and tolerances of the capacitors, and tolerances in the characteristics of internal gates of circuitry of the oscillator section. Usually, there may also be some other variables including the stray capacitance of a printed circuit board or other substrate on which token components are disposed. Over time, these variances often may cause the internal clock of the token to drift.

As well, the components in the token generator generally may also be influenced by changes in environmental conditions. Temperature flux, such as leaving a token in warm or cold conditions may also affect the circuitry and cause the internal clock to drift. Further, changes in humidity may also impact the token generator's circuitry affecting the internal clock time. Additionally, over time the oscillator's crystals may age, which may affect the period of the oscillation further causing the internal clock of the device to shift. Conventionally, to decrease internal clock drift of the token may require the token be designed with different components with higher tolerances, often with higher costs or creating a hardened device designed to withstand environmental changes without affecting function.

In at least one embodiment, the current techniques enable the Authenticator to estimate the internal drift of the clock by sampling clock variations over time to determine a function to predict clock drift. In some embodiments, the Authenticator may record the difference between the Authenticator's internal clock and the time of the token presented by the token generator. The Authenticator may use these values to determine an equation corresponding to the drift of the clock. In certain embodiments, the Authenticator may use linear regression to fit the drift of the clock to a linear function, such as one given by the equation $y=mx+b$. In other embodiments, the Authenticator may fit the line to parabolic or other non-linear predictive function.

In at least some embodiments, each passcode may be indexed to a particular time range. This may enable a passcode to be estimated to be within the range of passcode generation, i.e. within a particular 60 second window if passcodes are generated every 60 seconds. In other embodiments, if the passcode is generated every 30 seconds, the passcode may be estimated to be within a 30 second range. In an embodiment, when an Authenticator receives a passcode, the Authenticator may estimate the passcode was within the 30 second range. In this embodiment, if the passcode is off by two time indexes and the generation of the passcode occurs every 30 seconds, the clocks may have drifted 60 seconds. In other embodiment, the passcode may be indexed to any time range.

Figure 2:
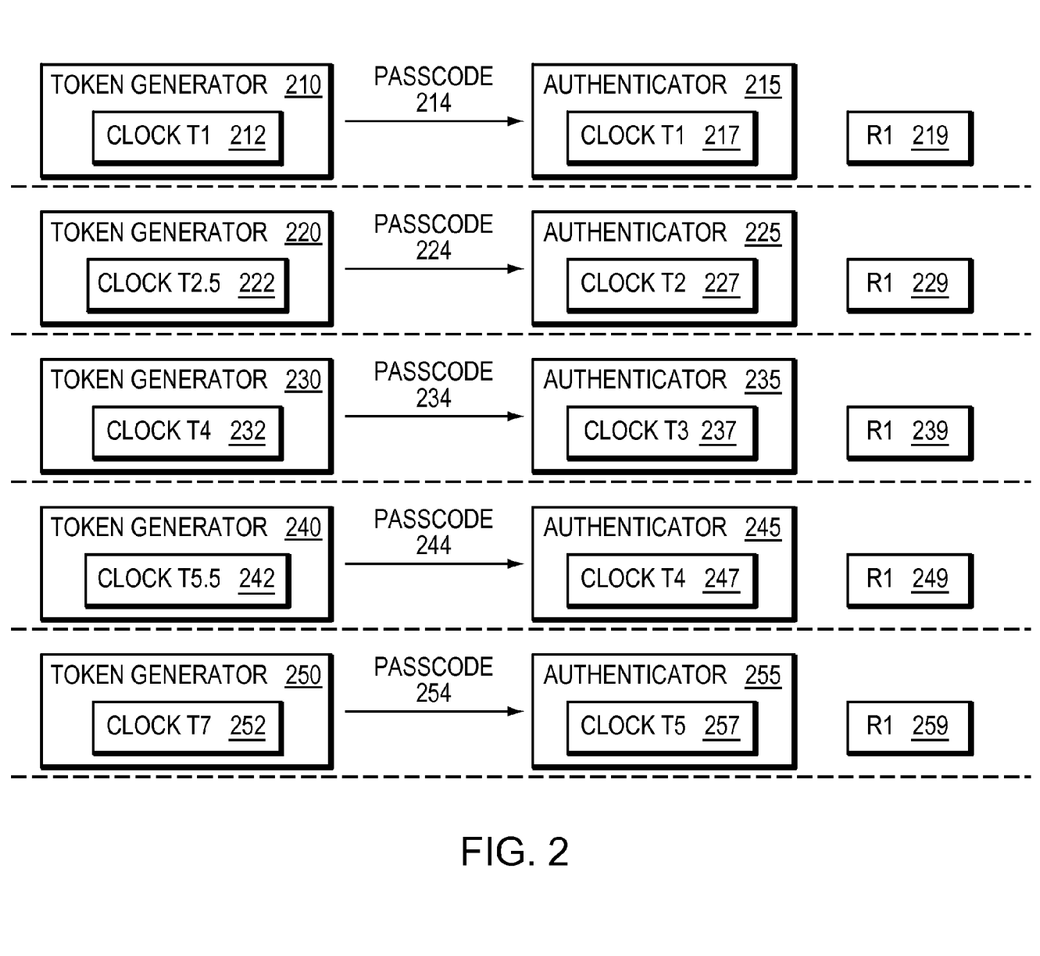
FIG. 2 is a flow diagram of an embodiment of clock drift in a security system.
Figure 3A:
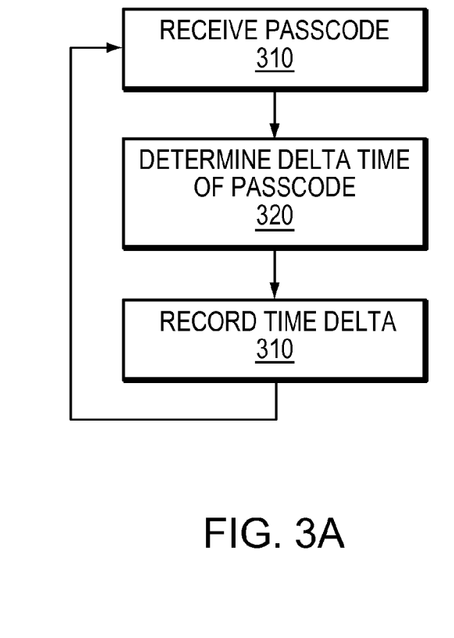
FIG. 3a is an embodiment of a method of the current techniques.

Refer now to the embodiments of FIGS. 2 and 3*a*. In the embodiment of FIG. 2, at reference time R1 219 a Token generator 210 has a clock 212 with time T1. As well, Authenticator 215 has a Clock 217 with time T1. At reference time R2 229, the Token Generator 220 has a clock 222 at time T2.5 while the Authenticator 225 has a Clock 227 at time T2. At reference time R2 229, the clocks 222 and 227 have diverged by a time of 0.5T. At reference time R3 239, the Token Generator 230 has a clock 232 at time T4 while the Authenticator 235 has a Clock 237 at time T3. At reference time R3 239, the clocks 232 and 237 have diverged by a time of 1T. At reference time R4 249, the Token Generator 240 has a clock 242 at time T5.5 while the Authenticator 245 has a Clock 247 at time T2. At reference time R4 249, the clocks 242 and 247 have diverged by a time of 1.5T. At reference time R5 259, the Token Generator 250 has a clock 252 at time T7 while the Authenticator 255 has a Clock 257 at time T7. At reference time R5 259, the clocks 252 and 257 have diverged by a time of 2T.

At reference time R1 219, the Authenticator 215 receives passcode 214 from Token generator 210 (step 310). The Authenticator may determine the delta between the time of the passcode generated by the Token Generator Clock 217 and the Authenticator Clock 217 (step 320). At the reference time R1 219, there may not be a recognizable difference in the time and no delta time or a delta of zero may be recorded (step 325).

At reference time R2 229, the Authenticator 225 receives passcode 224 from Token generator 220 (step 310). The Authenticator may determine the delta between the time of the passcode generated by the Token Generator Clock 222 and the Authenticator Clock 227 (step 320). At the reference time R2 229, the difference in the time between Clock 222 and 227 is 0.5 and a delta time of 0 may be recorded 325.

At reference time R3 239, the Authenticator 235 receives passcode 234 from Token generator 230 (step 310). The Authenticator may determine the delta between the time of the passcode generated by the Token Generator Clock 232 and the Authenticator Clock 237 (step 310). At the reference time R2 239, the difference in the time between Clock 222 and 227 is 1 and a delta time of 1 may be realized and recorded (step 325).

At reference time R4 249, the Authenticator 245 receives passcode 244 from Token generator 240 (step 310). The Authenticator may determine the delta between the time of the passcode generated by the Token Generator Clock 242 and the Authenticator Clock 247 (step 310). At the reference time R2 249, the difference in the time between Clock 242 and 247 is 1.5 and a delta time of 1 may be realized and recorded 345. At reference time R5 259, the Authenticator 255 receives 310 passcode 254 from Token generator 250. The Authenticator may determine 320 the delta between the time of the passcode generated by the Token Generator Clock 252 and the Authenticator Clock 257. At the reference time R2 259, the difference in the time between Clock 252 and 257 is 2 and a delta time of 2 may be realized and recorded (step 325).

Note that in the embodiment of FIG. 2, the token generator clock is being incremented 1.5T each increment is Reference time R. The Authenticator clock is staying constant with the reference time. Further note that due to the amount of drift between the clocks, the Authenticator may only notice the drift has increased every other time period. Further note that if the tokens were not sent regularly, the drift may be more detectable than relatively small drifts. This may be because, relative to a token interval, a small drift may take a longer time to be noticed, based on the difference in time between the requests for authentication of a passcode. In other embodiments, the drift may be more or less than 1.5T or may be increased or decreased by any factor, including factors that are not linear. In some embodiments the factor may be exponential or logarithmic. In other embodiments, the function may be a step function.

Figure 3B:
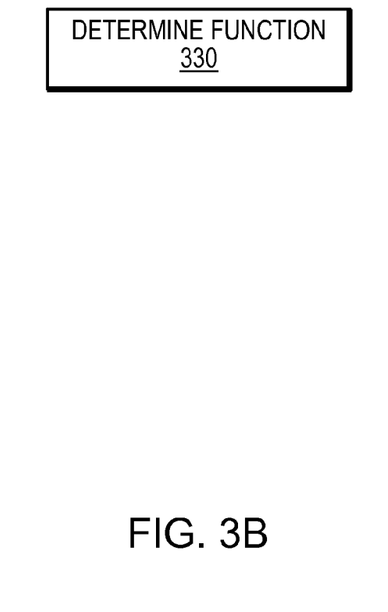
FIG. 3b is an alternative embodiment of a method of the current techniques.
Figure 3C:
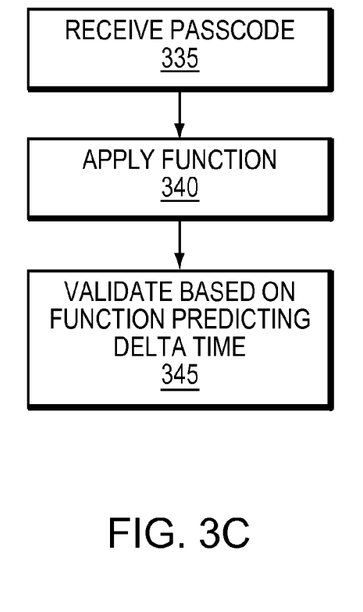
FIG. 3c is an alternative embodiment of a method of the current techniques.
Figure 4:
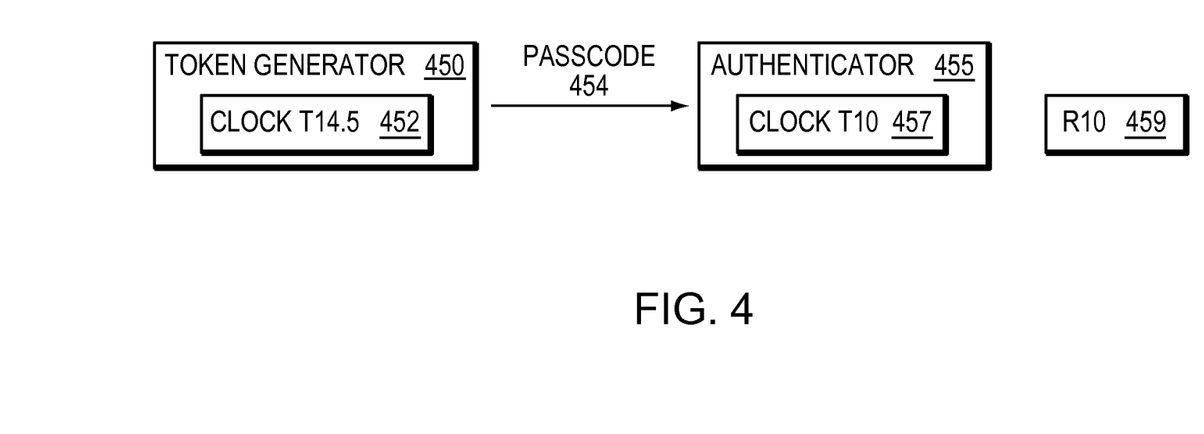
FIG. 4 is an embodiment of an apparatus according to the current techniques.

Refer now to embodiments of FIGS. 3b, 3c and 4. In FIG. 4, at time R10 Token Generator 450 may send passcode 354 to Authenticator 455 based on the Token Generator Clock 452 time of T14.5. Authenticator 455 may determine 330 a function based on the recorded time differences, for example the time differences outlined in the embodiment of FIG. 2. Authenticator 455 may receive 335 passcode 455, apply 340 a function to determine the internal time of the token, and use the estimated internal token time to validate 345 the passcode based on the calculated drift.

Figure 5:
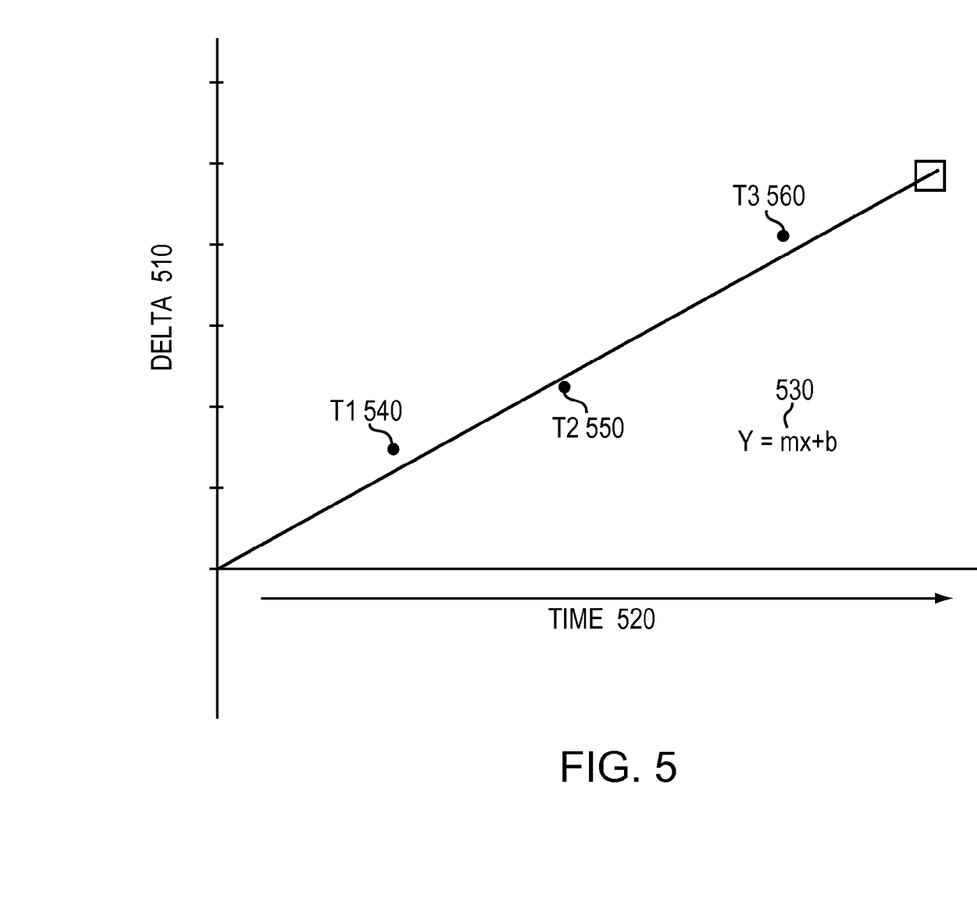
FIG. 5 is an embodiment of a graph of the clock shift according to the current techniques.
Figure 6:
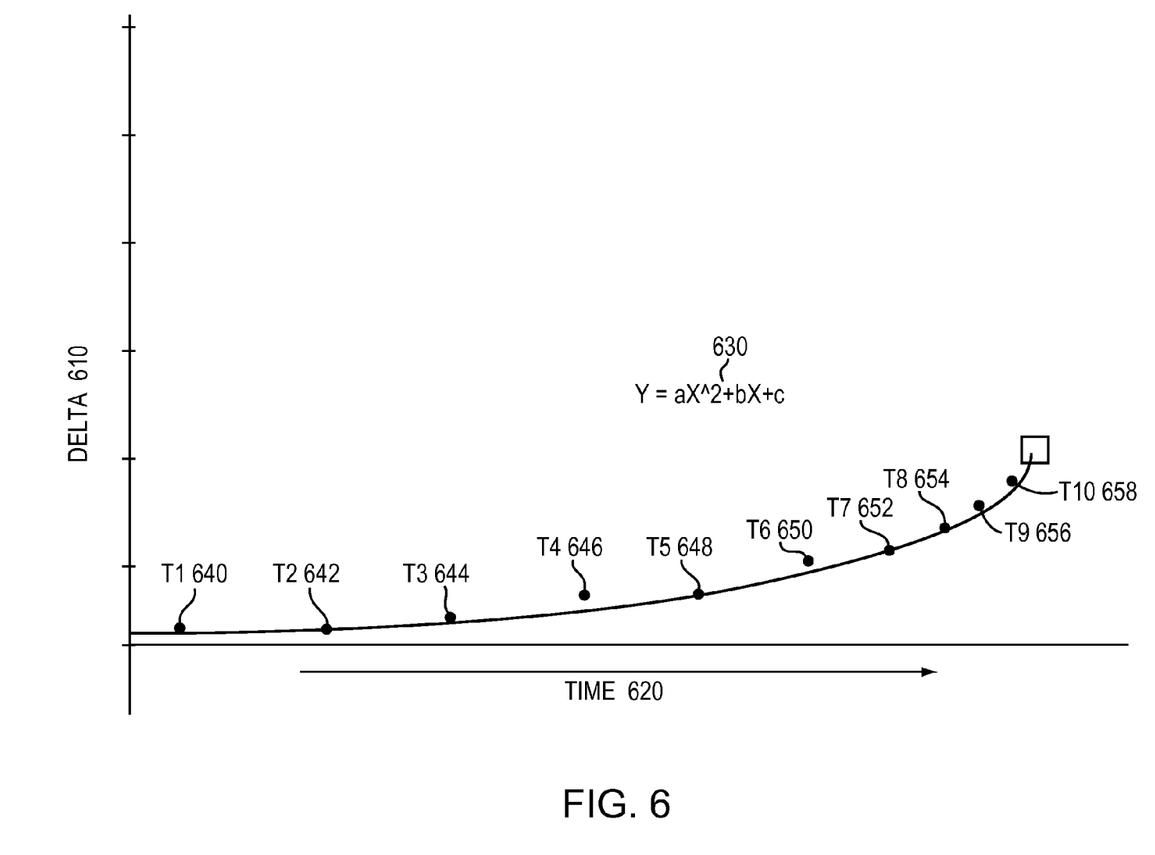
FIG. 6 is an alternative embodiment of a graph of the clock shift according to the current techniques.

Refer now to the embodiments of FIGS. 5 and 6. FIGS. 5 and 6 display two graphs of differences in time (deltas) between the internal clocks of a token and an Authenticator. In the embodiment of FIG. 5, three times have been taken, T1 540, T2 550, and T3 560. For these points, a function may be determined 330. In this embodiment, the function may be expressed as the function $Y=MX+B$ 530. This function enables an Authenticator to plug in its internal time and determine the offset of the clock of a token generator. In FIG. 6, points T1 630, T2 642, T3 644, T4 646, T5 648, T6 650, T7 652, T8 654, T9 656, and T10 658 have been recorded. In this graph, the function may be mapped to $Y=aX^2+bX+c$ 630. Further, based on the mapped points, an appropriate function may be chosen to model the changes in time based on the data points. In certain embodiments, the function may be linear. In other embodiments, the function may be non-linear such as exponential or logarithmic. In other embodiments, the function may be a step function. In further embodiments, the function may be any function that maps the recoded differences between the clocks. In at least some embodiments, the function chosen may enable the Authenticator to estimate the time of the token clock.

In some embodiments, the plurality of data values recorded may correspond to a passcode value generated by the token generator. In other embodiments, plurality of data values recorded may correspond to a reading of time values generated by the token generator's clock. In further embodiments, the plurality of data values may correspond to an oscillator frequency read from the token generator's oscillator. In still further embodiments, the plurality of data values may be derived from the component valued used to construct the token generator.

In alternative embodiment, the equation which reflects the token drift prediction may be built at the time the token is manufactured by sampling data token drift during the production testing process. In some embodiments, token drift may be determined after the token is shipped by recording data which is captured during authentication sessions. In certain embodiments, token drift may be determined as part of the process where the admin issues the token to the user, by comparing the offset with the initial offset recorded at manufacturing. In other embodiments, any particular method enabling sampling of token generation may be used to estimate token drift.

One or more tokens 450 and Authenticators 455 may be, be included in, or include, by way of example and without limitation, a computer, a mobile telephone, a personal digital assistant (PDA), a smart card, an authentication token, a server, and/or various portions or combinations of these and other processing devices. One or more of tokens 450 and Authenticators 455 may thus be implemented as otherwise conventional processing devices programmed by software and/or firmware to perform portions of the technique as described herein. Conventional aspects of such equipment are well known to those skilled in the art, and are therefore not described in detail herein.

In an example implementation, the token comprises or is otherwise associated with an authentication token, such as an RSA SecurID® authentication token. However, the technique is adaptable in a straightforward manner to a wide variety of other cryptographic processing devices.

Token 450 may communicate with Authenticator 455 directly over respective links, or may communicate via one or more intermediary processing devices. For example, if the token comprises an authentication token, it may communicate with Authenticator 105 over an internet link or may using an intermediary device such a desktop or portable personal computer, mobile telephone or PDA to allow user entry of the passcode. Such intermediary devices are not specifically shown in FIG. 1, but token 110 may be viewed as comprising, for example, a combination of an authentication token and an associated computer or other intermediary device. As indicated above, the term "processing device" as used herein is intended to encompass such combinations of devices.

Details regarding certain conventional cryptographic techniques suitable for use in conjunction with the present invention may be found in, e.g., A. J. Menezes et al., Handbook of Applied Cryptography, CRC Press, 1997, which is incorporated by reference herein.

It should again be emphasized that the technique implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Figure 7:
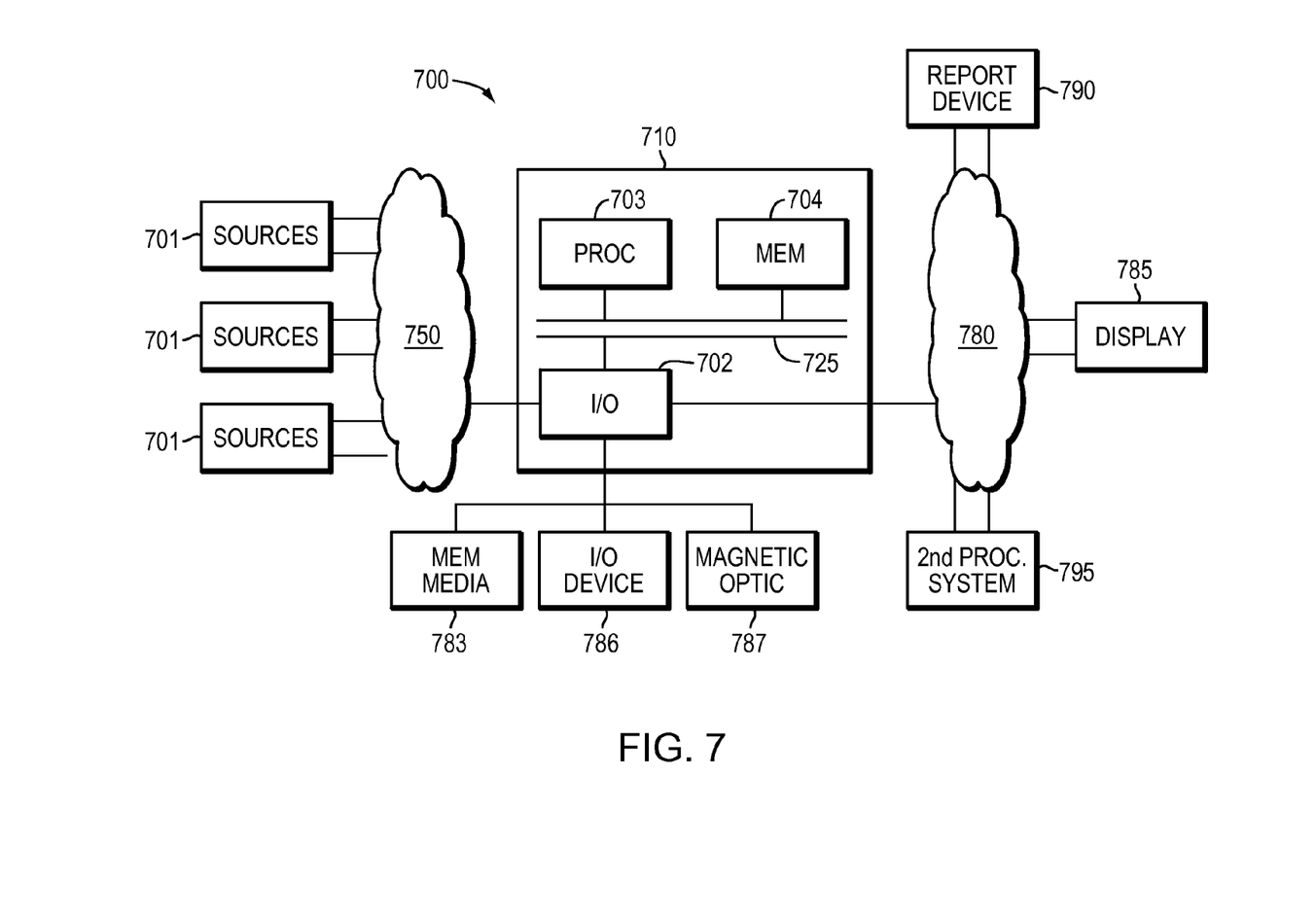
FIG. 7 shows an embodiment of the current invention as loaded on a computer.
Figure 8:
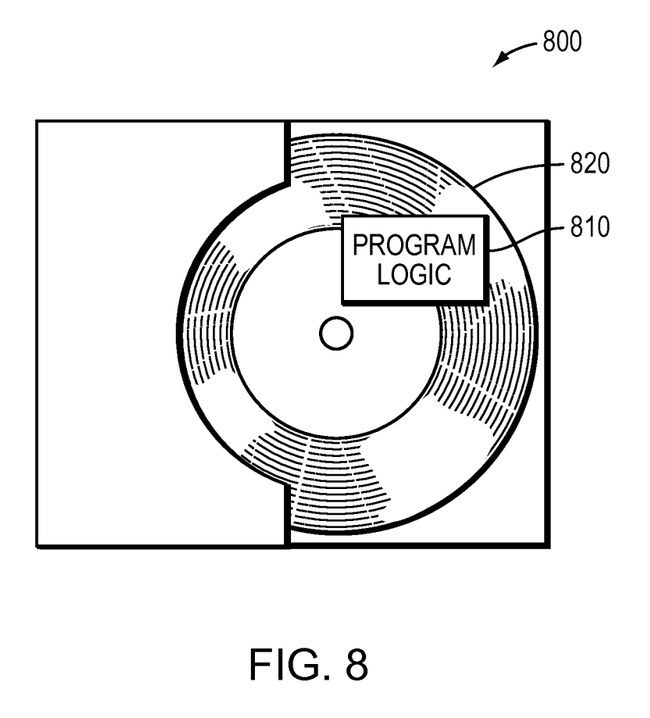
FIG. 8 shows an embodiment of a method of the current invention embodied as program code or a program product.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer of FIG. 7, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine. FIG. 8 shows Program Logic 810 embodied on a computer-readable medium 830 as shown, and wherein the Logic is encoded in computer-executable code configured for carrying out the reservation service process of this invention and thereby forming a Computer Program Product 800.

The logic for carrying out the method may be embodied as part of the aforementioned system, which is useful for carrying out a method described with reference to embodiments shown in, for example, FIG. 1 and FIG. 2. For purposes of illustrating the present invention, the invention is described as embodied in a specific configuration and using special logical arrangements, but one skilled in the art will appreciate that the device is not limited to the specific configuration but rather only by the claims included with this specification.

What is claimed is:

1. A method for use in estimating clock offset in a security environment, the security environment comprising a token generator comprising a token generator clock and an Authenticator comprising an Authenticator clock, the method comprising:
    recording a plurality of delta values; wherein each value of the plurality of delta values corresponds to a difference between the token generator clock and the Authenticator clock; wherein the authenticator clock is not able to communicate with the token generator clock; and
    fitting the plurality of delta values to a function to estimate the difference between the token generator clock and the Authenticator clock;
    receiving at the Authenticator a passcode;
    calculating, using the function, an offset for the token generator clock; and
    determining whether to authentic the passcode based on the offset and the passcode.

2. The method of claim 1 wherein each plurality of data values corresponds to a passcode value generated by the token generator.

3. The method of claim 1 wherein each plurality of data values corresponds to a reading of time values generated by the token generator's clock.

4. The method of claim 1 wherein each plurality of data values corresponds to an oscillator frequency read from the token generator's oscillator.

5. The method of claim 1 wherein each plurality of data values is derived from the component valued used to construct the token generator.

6. The method of claim 1 wherein the function is selected from a group consisting of a linear function and an exponential function.

7. The method of claim 1 wherein the function is non-linear.

8. The system of claim 1 wherein each plurality of data values corresponds to a passcode value generated by the token generator.

9. The system of claim 1 wherein each plurality of data values corresponds to a reading of time values generated by the token generator's clock.

10. The system of claim 1 wherein each plurality of data values corresponds to an oscillator frequency read from the token generator's oscillator.

11. The system of claim 1 wherein each plurality of data values is derived from the component valued used to construct the token generator.

12. The system of claim 1 wherein the function is selected from a group consisting of a linear function and an exponential function.

13. The system of claim 1 wherein the function is non-linear.

14. The method of claim 1 where each of the recorded plurality of delta values is recorded at a different time.

15. The method of claim 1 where each of the plurality of delta values is recorded at the authenticator.

16. A system for use in estimating clock offset, the system including a server with a processor and a memory, comprising:
    a token generator, the token generator comprising a token generator clock;
    an Authenticator, the Authenticator comprising an Authenticator clock; and
    computer executable code, the computer executable code configured to enable a computer perform:
        recording a plurality of delta values; wherein each value of the plurality of delta values corresponds to a difference between the token generator clock and the Authenticator clock; wherein the authenticator clock is not able to communicate with the token generator clock; and
        fitting the plurality of delta values to a function to estimate the difference between the token generator clock and the Authenticator clock;
    receiving at the Authenticator a passcode;
    calculating, using the function, an offset for the token generator clock; and
    determining whether to authentic the passcode based on the offset and the passcode.

17. A program product stored on a non-transitory computer readable medium for use in estimating clock offset in a security environment, the security environment comprising a token generator comprising a token generator clock and an Authenticator comprising an Authenticator clock, the program product containing computer executable code configured to enable a processor to execute the steps of:
    recording a plurality of delta values; wherein each value of the plurality of delta values corresponds to a difference between the token generator clock and the Authenticator clock; wherein the authenticator clock is not able to communicate with the token generator clock; and
    fitting the plurality of delta values to a function to estimate the difference between the token generator clock and the Authenticator clock;
    receiving at the Authenticator a passcode;
    calculating, using the function, an offset for the token generator clock; and determining whether to authentic the passcode based on the offset and the passcode.

18. The program product of claim 17 wherein each plurality of data values corresponds to a passcode value generated by the token generator.

19. The program product of claim 17 wherein each plurality of data values corresponds to a reading of time values generated by the token generator's clock.

20. The program product of claim 17 wherein each plurality of data values is derived from the component valued used to construct the token generator.

21. The program product of claim 17 wherein the function is selected from a group consisting of a linear function and a non-linear function.

* * * * *